Patented Oct. 31, 1950

2,528,224

UNITED STATES PATENT OFFICE 2,528,224

METHOD OF POLISHING SILVER CHLORIDE

Paul Giesecke, Stamford, Conn., and Norman B. Colthup, Yellow Springs, Ohio, assignors to American Cyanamid Company, New York, N. Y., a corporation of Maine No Drawing. Application May 28, 1947, Serial No. 751,140

4 Claims. (Cl. 41—41)

This invention relates to an improved fused or solid silver chloride and to a method for the the production thereof. More particularly, the invention is directed to an improved permanently highly polished and transparent solid silver chloride for use as lenses, prisms, windows and the like in optical instruments, and to the process for the production of such improved silver chloride by the treatment of fused or solid silver chloride as herein disclosed.

The most common procedure by which silver chloride is produced in solid form is that of fusion of this salt in its ordinary particulate form. Silver chloride which has been fused forms a solid waxy or horn-like transparent mass when allowed to cool below its melting point at 455° C. By subsequent rolling of the solid ingots produced upon cooling the melt, various shapes of workable stock may be produced from this horn-like solid. In its fused or solid form, silver chloride has found extensive application in optical instruments, particularly for infrared photography and the like. For example, windows of fused or solid silver chloride are used in aircraft for infrared photography. Also lenses and prisms of varying sizes and shapes have been machined from fused or solid silver chloride for adaptation to the particular requirements of its use in infrared photographic and other optical instruments.

Among the most important characteristics which must be possessed by the fused or solid silver chloride in its use in optical instruments for photographic apparatus or the like are that the surface of the solid must have a permanent high polish and the surface of the window, prism, lens or the like must be permanently highly transparent.

In the past, the solid silver chloride windows which have been produced have been polished merely by means of the highly polished steel rolls used for rolling the silver chloride ingot into the required window shape. However, difficulty has frequently been encountered in producing a highly polished transparent surface by this procedure. In many instances, a thin surface film was formed resulting in windows which did not possess the critical properties of high polish and high transparency, but on the contrary the surfaces of such windows were dull and tended to be opaque or at best merely translucent. Recourse to further polishing on the steel rolls did not obviate this difficulty, since the film of reduced silver chloride could not be removed by this expedient.

Polishing with abrasives was then employed which readily removed the deposit of reduced silver chloride. However, it still remained impossible by such ordinary methods of polishing to obtain a solid silver chloride window having the requisite high polish and transparency of surface. So also with the prisms and lenses which required machining subsequent to rolling, and which could not be finally polished by means of the steel rolls, the use of abrasives in ordinary methods of polishing did not produce the critical high polish and transparency of surface in the finished article.

The principal method of polishing employed in using abrasives was that known as lapping. Lapping may be defined as a grinding or polishing operation performed by repeated relative movement between the surface to be ground or polished and another softer surface with abrasive particles inserted between the surfaces and penetrating the softer surface. A lap is a tool composed of a soft metal, such as lead, or high lead content brass, and for finer work the lap may be covered with felt or muslin. The lap, which presents the relatively soft surface, is used as a conveying agent in applying a polishing powder of emery, corundum, aluminum oxide, etc. Where a finer lapping is desired for high polish, an abrasive in flour form is used, such as rouge. The lap is charged with the requisite amount of abrasive and this is partially rubbed into the surface of the lap by means of an agate stone or the like.

For polishing small pieces, the lap may be mounted on a fixture and the surface to be polished is passed over the surface of the lap by hand. For larger pieces involving plane and cylindrical lapping, a power driven rotary lap is used and the stock is held in the operator's hand or is mounted in a stock fixture in working engagement with the lap.

It has been discovered according to the present invention that by using an aqueous solution of a solvent for silver chloride during the polishing operation the surface of the solid silver chloride is thereby rendered permanently highly polished and transparent.

It is not intended that the present invention be limited to any theory of action, but it is believed that the improved results thereof are due to the fact that the aqueous solution of the solvent for silver chloride, by exerting a solvent or softening action upon the thin surface layer or film on the solid silver chloride produced by the rolling subsequent to fusion, imparts to this layer an improved flow characteristic, which during the lapping process results in the production of a smoother, more highly polished and transparent surface. It suffices to state that the improved results are obtained without exception when an aqueous solution of a solvent for silver chloride is used during the lapping step.

It is an advantage of the invention that the improved process may be operated without further modification of the ordinary methods employed in the polishing and lapping of these solid silver chloride windows, lenses, prisms and the like.

It is a further advantage of the invention that it is in no way limited to any particular solvents for silver chloride or to the concentrations of the aqueous solutions thereof which may be utilized.

Another important advantage of this invention is that the improved solid silver chloride is produced by this new process regardless of the mode of preparation of the silver chloride in the solid form. Most solid silver chloride, however, is produced by the fusion method above referred to.

Aqueous solutions of any of the known solvents for silver chloride are suitable for readily obtaining a highly polished and transparent surface on solid silver chloride according to the process. The following are mentioned by way of example as being representative, ammonium hydroxide, alkali metal thiosulfates, alkali and alkaline earth metal cyanides, alkali metal sulfites and alkali metal thiocyanates. Although these solvents are preferred, any salts having metallic or ammonium cations combined with these anions, which salts are water soluble, may be used in place of those above enumerated, for example, the alkaline earth metal salts or any of the heavier metal salts which are water soluble. An aqueous solution of ammonium chloride also gives satisfactory results.

According to the process, solid silver chloride in any form, that is, such as windows, prisms, lenses, and the like of various sizes and shapes which have been produced, for example, by fusion of silver chloride in particulate form and subsequent rolling of the ingot formed, together with any additional treatment or machining incident to preparation of the desired finished article, is subjected to an initial polishing action to remove any film or deposit of reduced silver chloride using any abrasive material commonly used for polishing solid surfaces, such as emery, corundum, aluminum oxide or silicon carbide. After subjection to this polishing step, the partially polished solid silver chloride has a much smoother surface, but still retains a dull, translucent finish. The solid is then subjected to repeated lapping in which the lap is fined by using floured abrasives or rouges common to fine lapping of solid surfaces to produce an optimum smoothness, regularity and uniformity of surface. As a result of this lapping procedure, the product contains a polished surface but is not sufficiently highly polished to be suitable for use in windows, lenses, prisms and the like for optical instruments. Moreover, the surface at best is still only translucent and to be suitable for the purpose intended it must be transparent and clear.

According to the invention the surface of the solid silver chloride is then wetted with an aqueous solution of a solvent for silver chloride, and preferably this is done prior to the final lapping operation. Upon lapping the surface after application of the aqueous solution of the solvent, the improved solid silver chloride having a surface with a permanent high polish and transparency results.

The process is more fully described with reference to the following example which is given by way of illustration and is not to be construed as a limitation of the invention.

*Example*

A silver chloride window blank, after machine rolling and contact with a brass holder, was found to have a surface coating which contained some reduced silver and which was sufficiently opaque to reduce the transparency of the window blank below a useful figure. The blank was first subjected to grinding with a fine carborundum abrasive paper. This removed the film but left a mat surface. The blank was then polished with a cloth lap and a very fine aluminum oxide buffing powder. The cloth was wet with a 5% water solution of sodium thiosulfate. Lapping was continued until a high polish resulted. Finally, the blank was transferred to a dry lap for the finishing of the surface. A window of high polish and excellent transparency resulted.

The results are the same when a comparable strength of aqueous sodium cyanide is substituted for the sodium thiosulfate.

In the specific example, there is described a typical operation using approximately 5% aqueous solution of the silver chloride dissolving reagent. The concentration is in no sense critical and can be varied within very wide limits almost to the saturation point. However, there is nothing gained in using very concentrated solutions as the effect on the silver chloride surface becomes very rapid and it is somewhat more difficult to control the polishing operation. We prefer, therefore, to use concentrations from slightly below 5% up to about 20%.

We claim:

1. A method of polishing a silver chloride blank which comprises lapping said blank with a lapping abrasive wet with a solvent for silver chloride until a highly polished surface is obtained, and dry polishing said surface.

2. A method according to claim 1 in which the solvent is an ammonium hydroxide solution.

3. A method according to claim 1 in which the solvent is an alkali metal thiosulfate solution.

4. A method according to claim 1 in which the solvent is a soluble cyanide solution.

PAUL GIESECKE.
NORMAN B. COLTHUP.

REFERENCES CITED

The following references are of record in the file of this patent:

UNITED STATES PATENTS

| Number | Name | Date |
|---|---|---|
| 2,328,533 | Walker | Aug. 31, 1943 |
| 2,354,091 | Sharpe | July 18, 1944 |
| 2,384,638 | Penberthy | Sept. 11, 1945 |

OTHER REFERENCES

Fungassi: Preparation of Silver Chloride Films Review Scientific Instruments, Aug. 1942, vol. 13, page 336.